(12) United States Patent
Seagraves et al.

(10) Patent No.: US 12,380,880 B2
(45) Date of Patent: Aug. 5, 2025

(54) END-TO-END AUTOMATIC SPEECH RECOGNITION WITH TRANSFORMER

(71) Applicant: Deepgram, Inc., San Francisco, CA (US)

(72) Inventors: Andrew Nathan Seagraves, Houston, TX (US); Deepak Subburam, Hoboken, NJ (US); Adam Joseph Sypniewski, Dexter, MI (US); Scott Ivan Stephenson, Burlingame, CA (US); Jacob Edward Cutter, San Ramon, CA (US); Michael Joseph Sypniewski, Ypsilanti, MI (US); Daniel Lewis Shafer, Frederick, MD (US)

(73) Assignee: Deepgram, Inc., San Francisco, CA (US)

( * ) Notice: Subject to any disclaimer, the term of this patent is extended or adjusted under 35 U.S.C. 154(b) by 310 days.

(21) Appl. No.: 18/129,996

(22) Filed: Apr. 3, 2023

(65) Prior Publication Data
US 2024/0331685 A1    Oct. 3, 2024

(51) Int. Cl.
*G10L 15/16* (2006.01)
*G10L 15/02* (2006.01)
*G10L 15/06* (2013.01)
*G10L 15/26* (2006.01)

(52) U.S. Cl.
CPC .............. *G10L 15/16* (2013.01); *G10L 15/02* (2013.01); *G10L 15/063* (2013.01); *G10L 15/26* (2013.01); *G10L 2015/025* (2013.01); *G10L 2015/0633* (2013.01)

(58) Field of Classification Search
CPC ................................ G10L 15/16; G10L 15/26
See application file for complete search history.

(56) References Cited

U.S. PATENT DOCUMENTS

| | | | |
|---|---|---|---|
| 11,915,690 B1* | 2/2024 | Chang | G10L 19/008 |
| 12,002,451 B1* | 6/2024 | Liu | G10L 15/16 |
| 2016/0078339 A1* | 3/2016 | Li | G06N 3/082 |
| | | | 706/20 |
| 2020/0243094 A1* | 7/2020 | Thomson | G10L 15/28 |
| 2022/0115006 A1* | 4/2022 | Hori | G10L 15/07 |
| 2022/0207321 A1* | 6/2022 | Gulati | G06N 3/04 |

(Continued)

OTHER PUBLICATIONS

Paraskevopoulos, Georgios, et al. "Multimodal and multiresolution speech recognition with transformers." Proceedings of the 58th Annual Meeting of the Association for Computational Linguistics. 2020. (Year: 2020).*

(Continued)

*Primary Examiner* — Shaun Roberts
(74) *Attorney, Agent, or Firm* — Cognition IP, P.C.; Edward Steakley; Saleh Kaihani (57) ABSTRACT

An end-to-end automatic speech recognition (ASR) system can be constructed by fusing a first ASR model with a transformer. The input of the transformer is a learned layer generated by the first ASR model. The fused ASR model and transformer can be treated as a single end-to-end model and trained as a single model. In some embodiments, the end-to-end speech recognition system can be trained using a teacher-student training technique by selectively truncating portions of the first ASR model and/or the transformer components and selectively freezing various layers during the training passes.

20 Claims, 7 Drawing Sheets

(56) References Cited

U.S. PATENT DOCUMENTS

| | | | |
|---|---|---|---|
| 2022/0230629 A1* | 7/2022 | Zhu | G10L 15/02 |
| 2022/0301550 A1* | 9/2022 | Wei | G10L 25/30 |
| 2022/0310108 A1* | 9/2022 | Byun | G10L 21/038 |
| 2022/0343894 A1* | 10/2022 | Doutre | G10L 15/18 |
| 2022/0383858 A1* | 12/2022 | Wu | G06N 3/0464 |
| 2023/0081306 A1* | 3/2023 | Kuo | G06N 3/09 |
| | | | 704/200 |
| 2023/0130634 A1* | 4/2023 | Sainath | G06N 3/0455 |
| | | | 704/232 |
| 2023/0343332 A1* | 10/2023 | Huang | G10L 15/04 |
| 2023/0410794 A1* | 12/2023 | Fu | G10L 15/26 |
| 2024/0304179 A1* | 9/2024 | Kim | G10L 15/16 |

OTHER PUBLICATIONS

Yeh, Ching-Feng, et al. "Transformer-transducer: End-to-end speech recognition with self-attention." arXiv preprint arXiv: 1910.12977 (2019). (Year: 2019).*

Dong, Linhao, Shuang Xu, and Bo Xu. "Speech-transformer: a no-recurrence sequence-to-sequence model for speech recognition." 2018 IEEE international conference on acoustics, speech and signal processing (ICASSP). IEEE, 2018. (Year: 2018).*

Kanda, Naoyuki, et al. "End-to-end speaker-attributed ASR with transformer." arXiv preprint arXiv:2104.02128 (2021). (Year: 2021).*

Gulati, Anmol, et al. "Conformer: Convolution-augmented transformer for speech recognition." arXiv preprint arXiv:2005.08100 (2020). (Year: 2020).*

Vaswani, Ashish et al "Attention is all you need" https://arxiv.org/abs/1706.03762v1 (2017). (Year: 2017).*

* cited by examiner

END-TO-END AUTOMATIC SPEECH RECOGNITION WITH TRANSFORMER

BACKGROUND

Field

This invention relates generally to the field of artificial intelligence, and more particularly to using artificial intelligence techniques for conversion of audio to text.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Automatic speech recognition (ASR) systems exist and can have a variety of useful applications. ASR systems receive an input audio and can produce a transcript of the received audio. Some ASR systems utilize artificial intelligence (AI) models to detect words, phonemes or other units of speech and assemble them into sentences.

SUMMARY

The appended claims may serve as a summary of this application.

BRIEF DESCRIPTION OF THE DRAWINGS

These drawings and the associated description herein are provided to illustrate specific embodiments of the invention and are not intended to be limiting.

DETAILED DESCRIPTION

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

Figure 1:
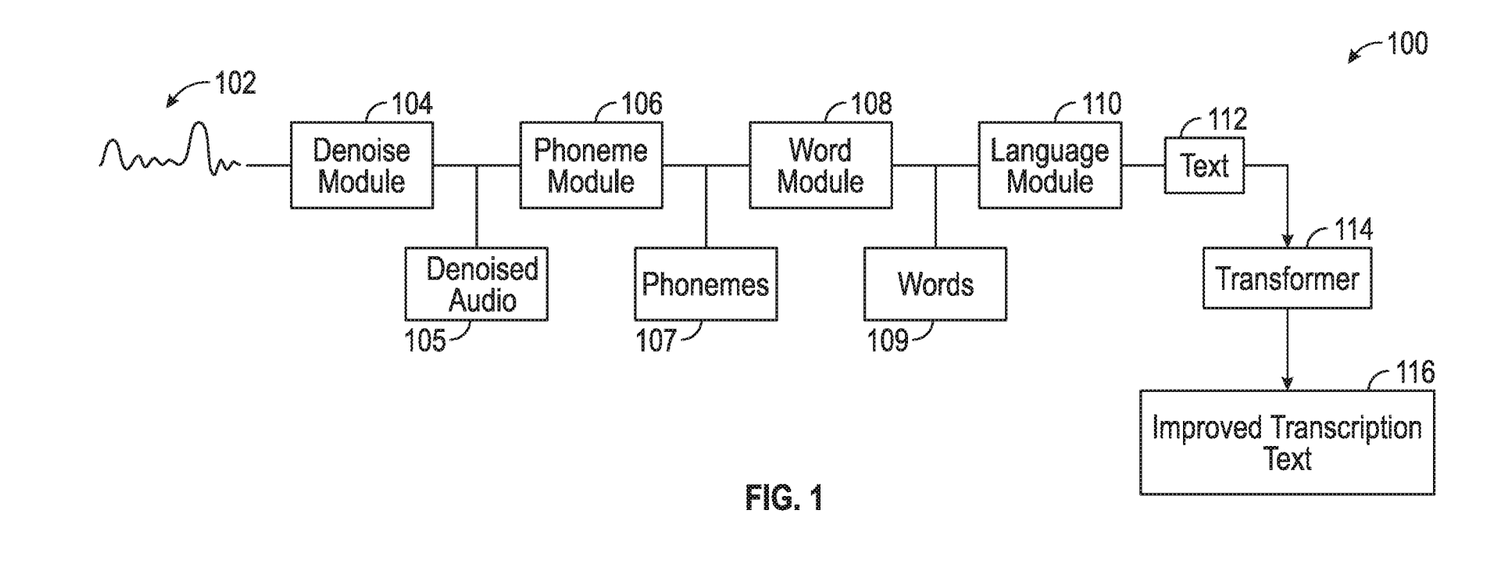
FIG. 1 illustrates an example of an automatic speech recognition pipeline.

Some automatic speech recognition (ASR) systems include pipelines, which in turn include distinct components that produce high-level intermediary outputs between the distinct components of the pipeline. FIG. 1 illustrates an example ASR pipeline 100. The ASR pipeline 100 accepts an input audio 102 and outputs text 112. The text 112 is a transcription of the input audio 102. The ASR pipeline 100 can include a variety of distinct components, such as a denoising module 104, a phoneme module 106, a word module 108 and a language module 110. The ASR pipeline 100 processes the input audio 102 in the same manner that a human brain might process an input audio. For example, to transcribe the text from the input audio 102, the ASR pipeline 100 can perform sequential and distinct operations, including for example, denoising the input audio 102, determining phonemes, identifying words from the phonemes, and generating words from the phonemes by using a language model. Therefore, the ASR pipeline 100 can include distinct components such as a denoise module 104, a phoneme module 106, a word module 108 and a language model 110.

The modules of the ASR pipeline 100 can be implemented with a variety of artificial intelligence (AI) networks optimized for processing input audios. Examples include, convolutional neural networks (CNNs), recurrent neural networks (RNNs), long short-term memory networks (LSTMs), and many others. In some implementations, the output text 112 can be further processed using additional AI networks, such as a transformer 114, to further improve the accuracy of transcription. Transformers can include encoder/decoder pairs that accept text 112 and output improved transcription text 116. Transformers are also implemented using AI networks, such as neural networks.

Using distinct components in the ASR pipeline 100 can lead to producing intermediary high-level outputs, for example, the denoised audio 105, phonemes 107, and human-readable words 109. In most cases, where the ASR pipeline 100 may be deployed, such high-level outputs are not part of the output requirement of the user of the ASR pipeline 100. In other words, the user of the ASR pipeline 100, typically, does not require denoised audio 105, phonemes 107, and words 109; instead, the user is typically interested in obtaining a transcript of the input audio 102. Nevertheless, the ASR pipeline 100 can expend substantial resources in generating such high-level intermediary outputs. In one respect, the ASR pipeline 100 can be said to employ a piecewise approach for generating its output. ASR pipelines utilizing piecewise approaches, with distinct components that produce high-level intermediary outputs, can be hard to train. They can also be less accurate and slow during inference operations. When one module is modified, all downstream modules also have to be modified. For example, if the phoneme module 106 is retrained to produce better outputs, the downstream modules such as the word module 108 and the language module 110 may also need to be retrained to function with the new outputs of a modified phoneme module 106.

Another challenge with ASR pipelines using the piecewise approach is inaccuracy. For example, some existing piecewise approaches utilize models that are too small to be able to handle complex speech recognition tasks accurately. For example, Markov models or finite state transducers are sometimes used, which can be too small to accurately model complex speech. Another challenge with the piecewise approach is that the resulting pipeline can be slow during both training and inference operations. This is in part attributable to the pipeline generating high-level intermediary outputs, such as denoised audio 105, phonemes 107, words 109 and other intermediary outputs, but also due to the piecewise approach in general.

The piecewise approach illustrated in the ASR pipeline 100 is not limited to only the ASR pipelines that produce high-level intermediary outputs. Some state-of-the-art ASR pipelines may not produce high-level intermediary outputs, but still use a piecewise approach in the transformer portion of their operations. For example, some modern ASR pipelines that may be characterized as end-to-end, without high-level intermediary outputs, still use transformers as end-blocks, in a piecewise manner. Such ASR pipelines produce text in a final layer prior to a transformer layer, tokenize the text into an intermediary feature space compatible with the transformer, obtain an output of the transformer and convert the output of the transformer, which is a numerical output, into human-readable text. In other words, transformers can be appended to a piecewise ASR pipeline, or an end-to-end ASR pipeline, to further improve the quality of the transcribed text 112. Nonetheless, such piecewise use of transformers still exposes the overall pipeline to the challenges of a piecewise approach. For example, the ASR pipelines that use the transformers as an add-on end block can be inefficient due to having to produce high-level intermediary outputs, such as the production of text in the layer prior to the transformer layer.

Nonetheless, a transformer 114 can be appended to a piecewise ASR pipeline, or an end-to-end ASR pipeline to generate text, predict text, correct text, and generally to further improve the transcribed text 112. The transformer 114 generates the improved transcription text 116. Using the add-on or appending approach, in a piecewise manner, makes the transformer 114 into another distinct module that is trained and deployed independent of the other modules of the ASR pipeline. Consequently, the challenges outlined above for a piecewise approach can equally apply to an ASR pipeline utilizing a transformer 114 at the output as an add-on, end block. Nonetheless, using the transformers in a piecewise approach can be attractive, as off-the-shelf transformers can be appended into an existing ASR pipeline to improve its output, despite the inefficiencies of doing so in a piecewise manner.

The challenges of a piecewise approach, whether in the ASR pipeline and/or in the transformer, can be addressed by utilizing an end-to-end automatic speed recognition pipeline, which fuses the transformer operations into the ASR pipeline, eliminating high-level intermediary outputs. In this approach, the input audio is processed in a single end-to-end model, avoiding generating resource-intensive high-level intermediary outputs. A transformer deployed in an end-to-end ASR pipeline can be fused into the pipeline by making the last pre-transformer layer a learnable layer that produces the inputs of the transformer. While traditional transformers appended to ASR pipelines receive text as input, a transformer fused with an ASR pipeline can receive its inputs from a learned layer as opposed to text. In other words, the inputs of the transformer are part of intermediary learned representations of an end-to-end ASR pipeline, as opposed to text inputs as used in other usages of the transformers.

Figure 2:
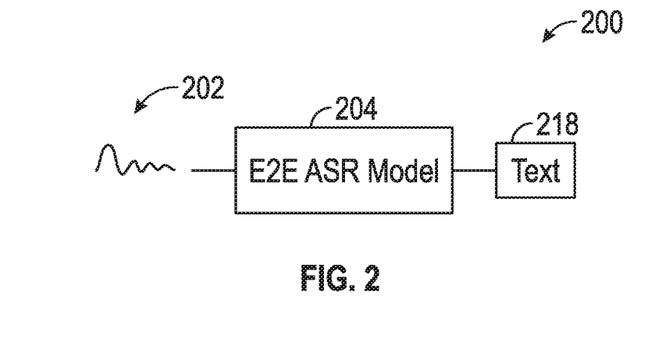
FIG. 2 illustrates an example of an end-to-end automatic speech recognition pipeline.

FIG. 2 illustrates an example of an end-to-end automatic speech recognition pipeline 200. The pipeline 200 can receive an input audio 202, process the input audio 202 through an end-to-end ASR model 204 and generate text 218. The pipeline 200 can include a transformer or transformer operations, not as a distinct component, but as part of a single model that makes up the end-to-end ASR model 204. In the pipeline 200, the transformer or transformer operations are fused with prior layers of the pipeline, such that the entire pipeline 200 acts as a single model, where the activations of some layers of the pipeline 200 are inputs to the transformer. The parameters of the learned layer can be trained along with the other layers of the pipeline 200.

Various advantages that can be realized by utilizing an end-to-end single model can also be realized by an end-to-end ASR model that includes a transformer or transformer operations as an internal part of the model. In this manner, the pipeline 200 can include the advantages of both an end-to-end model, as well as the benefits and added improvements of transformer operations. Compared to a piecewise ASR pipeline, or a pipeline, which uses a transformer as an added end-block, the pipeline 200 can be more accurate, easier to train and faster during inference operations. For example, training operations are more flexible, as there is only one model to train. Compared to small, piecewise models that have only a few parameters, the end-to-end ASR model 204 can have hundreds of millions or billions of parameters, substantially increasing the ability of the end-to-end ASR model 204 to model speech and language in a resource-efficient manner, since high-level intermediary outputs are avoided or reduced.

An end-to-end ASR model 204 can also be processed on modern hardware, optimized to perform parallel processes favored by artificial intelligence networks. For example, the end-to-end ASR model 204 can be processed on graphics processing units (GPUs), tensor processing units (TPUs) and other similar modern hardware. The use of multiple models in a piecewise approach can in some cases make it difficult to use the modern hardware. For example, it may be difficult to load an entire pipeline, having a plurality of models into a single GPU to perform efficient parallel processes. The end-to-end ASR model 204, on the other hand, consists of a single model and can be loaded into modern hardware, such as a GPU or TPU. The ability to load the end-to-end ASR model 204 to such hardware increases the efficiency of audio processing using the model, compared to traditional ASR.

Figure 3:
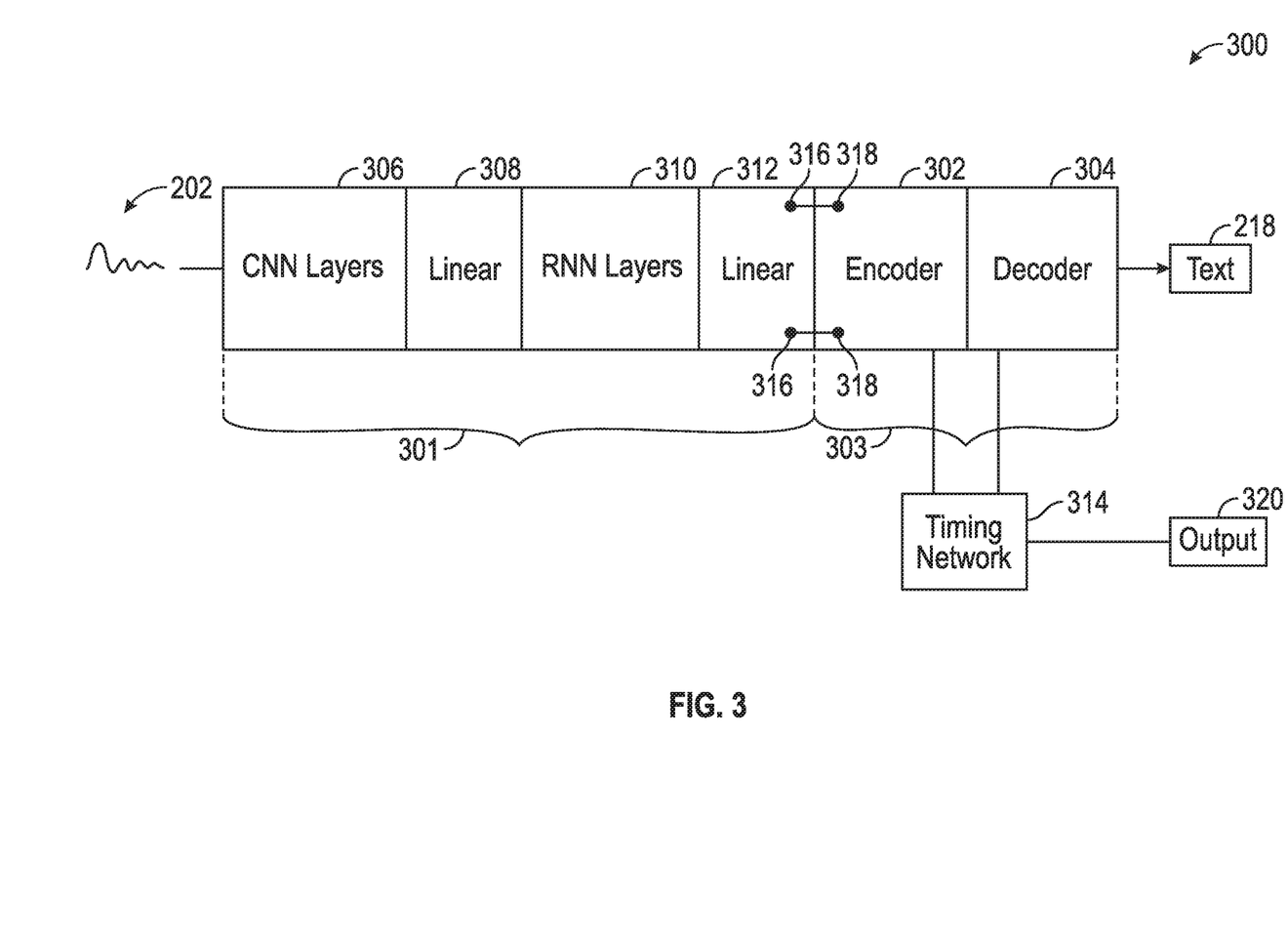
FIG. 3 illustrates an example end-to-end automatic speech recognition model that includes transformer operations as part of the model.

FIG. 3 illustrates an example end-to-end ASR model 300 ("pipeline 300") that includes transformer operations as an internal part of the model. The pipeline 300 can internally include another end-to-end ASR model 301 and a transformer 303, but unlike the piecewise approach, the transformer 303 is not an add-on end-block receiving text inputs from the previous layers; instead, the previous layers learn the inputs of the transformer 303 during the training operations and provide compatible inputs to the transformer 303. For example, the ASR model 301 can learn transformer embedding vectors and feed them as input to the transformer 303. Consequently, the pipeline 300 is a combination pipeline formed by fusing an end-to-end ASR model 301 with a transformer 303.

The end-to-end ASR model 301 can be any end-to-end ASR model. An example is illustrated in FIG. 3. For example, the end-to-end ASR model 301 can be a stack of CNN layers 306, one or more linear layers 308, RNN layers 310 and one or more further linear layers 312. However, other architectures of the ASR model 301 are also possible, without departing from the spirit of the disclosed technology. The transformer 303 can include an encoder 302 and a decoder 304. The linear layers 308 and 312 may be multiplication layers, having parameters, such as weights and biases. For example, a linear layer 308 can follow a multiplication formula, such as $Y = A \cdot X + B$, where Y is output, X is input, and A and B are parameters that are learned through the training process of the end-to-end ASR model 301.

The CNN layers 306 are spatial. The parameters, such as weights and biases are shared across a kernel, no matter where the kernel is operating. So, the CNN layers 306 learn spatially independent data. In the context of speech recognition, the CNN layers 306 can detect speech-related features, no matter where they occur, similar to how CNNs can detect objects in an image, no matter where those objects appear in the image, the CNNs in speech recognition can identify speech tokens, no matter where the tokens are in a speech. Without loss of generality, the CNNs can be squeeze-and-excitation CNNs, or time-depth separable CNNs. The RNN layers 310 are temporal. They learn and can infer sequence and timing data. The end-to-end ASR model 301 does not explicitly model high-level intermediary outputs, such as phonemes 107 and words 109, but trained and deployed as a single model, the CNN layers 306 can detect features, such as phonemes and words and the RNN layers 310 can piece them together. The linear layers 308 can match the number of dimensions in the CNN layers 306 with the number of dimensions needed at the RNN layers 310. Such RNNs can include LSTMs, GRUs, or other RNNs based on sequence-learning layers.

AI models operate in a number space (as opposed to audio space or text space), so the RNN layers output numbers. Without the transformer 303, the linear layers 312 can map a number-format output by the previous layers into a human-readable transcription. However, when an encoder-decoder transformer 303 is used, the linear layers 312 can produce an output 316 compatible with the input 318 of the transformer 303. Alternatively, an input layer of the transformer 303 can be modified to accept, as input, the output of a linear layer 312. In other words, in the pipeline 300, the internal state of the pipeline in the linear layers 312 is the same as the required state by the transformer 303 that follows the linear layers 312. Configuring the compatibility of the output of the terminating layer of the end-to-end ASR model 310 with the input of the transformer 303 depends on the specifics of the terminating layer and the input layer of the transformer. For example, a linear layer can perform a conversion that transfers the output 316 to a size required by the input 318. Some linear algebra operations on matrices, vectors and/or tensors may also be performed via linear or convolutional layers, if they are used as the terminating layers of the end-to-end ASR model 310, to convert the output 316 to a space compatible with the input 318.

Furthermore, the interface layer of the ASR model 301 and the transformer 303 is a learned layer, where the parameters that form the outputs/inputs 316, 318, at the interface between the last layer of the ASR model 301 and the transformer 303, are learned parameters, as opposed to text. Compared to traditional transformers that receive text input, the fused transformer 303 receives a set of learned parameters. For example, in some embodiments, the ASR model 301 learns and generates the internal embedding vectors of the transformer 303. In other words, the outputs/inputs 316, 318 can be the embedding vectors of the transformer 303.

While not shown, the pipeline 300 can include one or more linear layers after the transformer 303, for example to map the number output to human readable sentences. The transformer 303 can also include a timing network 314, which can enable the transformer 303 to learn and infer timing information for tokens predicted by the transformer 303. A token is an instance of a sequence of characters in some particular document that are grouped together as a useful semantic unit for processing. The timing network 314 produces output 320, which includes the timing data of the tokens predicted by the transformer 303.

Transformers use an attention mechanism without an RNN, processing all tokens at the same time and calculating attention weights between them in successive layers. Since the attention mechanism only uses information about other tokens from lower layers, it can be computed for all tokens in parallel, which leads to improved training speed. Like sequence-to-sequence models, the transformer model uses an encoder-decoder architecture. The encoder consists of encoding layers that process the input iteratively one layer after another, while the decoder includes decoding layers that incorporate the encoder's output through a cross attention mechanism.

The function of each encoder layer is to generate encodings that contain information about which parts of the inputs are relevant to each other. It passes its encodings to the next encoder layer as inputs. Each decoder layer does the opposite, taking all the encodings and using their incorporated contextual information to generate an output sequence. To achieve this, each encoder and decoder layer makes use of an attention mechanism. For each input, attention weighs the relevance of every other input and draws from them to produce the output. Each decoder layer has an additional attention mechanism that draws information from the outputs of previous decoder layers before the decoder layer draws information from the encodings. Both the encoder and decoder layers can have a feed-forward neural network for additional processing of the outputs and contain residual connections and layer normalization steps.

Each encoder consists of two major components: a self-attention mechanism and a feed-forward neural network. The self-attention mechanism accepts input encodings from the previous encoder and weighs their relevance to each other to generate output encodings. The feed-forward neural network further processes each output encoding individually. These output encodings are then passed to the next encoder as its input, as well as to the decoders. The first encoder takes positional information and embeddings of the input sequence as its input, rather than encodings. The positional information is used by the transformer to make use of the order of the sequence. The encoder can be bidirectional. Attention can be placed on tokens before and after the current token. The encoder's attention mechanism can be global, where attention is placed on all other tokens. It can also be local, where attention is placed only on tokens that fall within a fixed window around the current token.

Each decoder consists of three major components: a self-attention mechanism, an attention mechanism over the encodings, and a feed-forward neural network. The decoder functions in a similar fashion to the encoder, but an additional attention mechanism is inserted which instead draws relevant information from the encodings generated by the encoders. This mechanism can also be called the encoder-decoder attention or cross attention. Like the first encoder, the first decoder takes positional information and embeddings of the output sequence as its input, rather than encodings. The transformer must not use the current or future output to predict an output, so the output sequence must be partially masked to prevent this reverse information flow. This allows for autoregressive text generation. For all attention heads, attention cannot be placed on following tokens. In some embodiments, the last decoder is followed by a final linear transformation, and a softmax layer, to produce output probabilities over a set of vocabulary. Additional layers (not shown) can map the probabilities to human-readable text.

Typically, encoders are designed to take an input text to an internal space by a process referred to as tokenization, where text input is mapped to a numerical format compatible with the input of a transformer. In this scenario, a transformer can include a tokenization layer prior to encoder and decoder layers. The pipeline 300 eliminates the tokenization layer as the output 316 of the ASR model 301 can be made to be compatible with the required input 318 of the transformer, thereby eliminating the need for a tokenization layer. In other words, the numerical input tokens needed by the transformer 303 are directly received from the last layer, or the terminating layer of the end-to-end ASR model 301, thereby eliminating the need to tokenize text to a numerical format via a tokenization layer.

As described earlier, the pipeline 300 is formed by fusing an end-to-end ASR model 301 with a transformer 303. The fusing can include making the output of an output layer of the ASR model 301, learnable and compatible with the input layer of the transformer 303. The fusing operation can include eliminating a tokenization layer, but also other changes in the output of the end-to-end ASR model 301, to make the output, learnable, and compatible with the input of the transformer 303. For example, some transformers are designed to transform one text sequence to another, while the pipeline 300 and the end-to-end ASR model 301 handle speech to text recognition. As such, the data traveling from the end-to-end ASR model 301 to the transformer 303 can be modified to be encoded with speech-related information. For example, some transformers do not include functionality to deal with silence. In this scenario, the end-to-end ASR model 301 can be modified to encode silence, for example, via a selected number, encoded in the output 316 of the ASR model 301.

Figure 4:
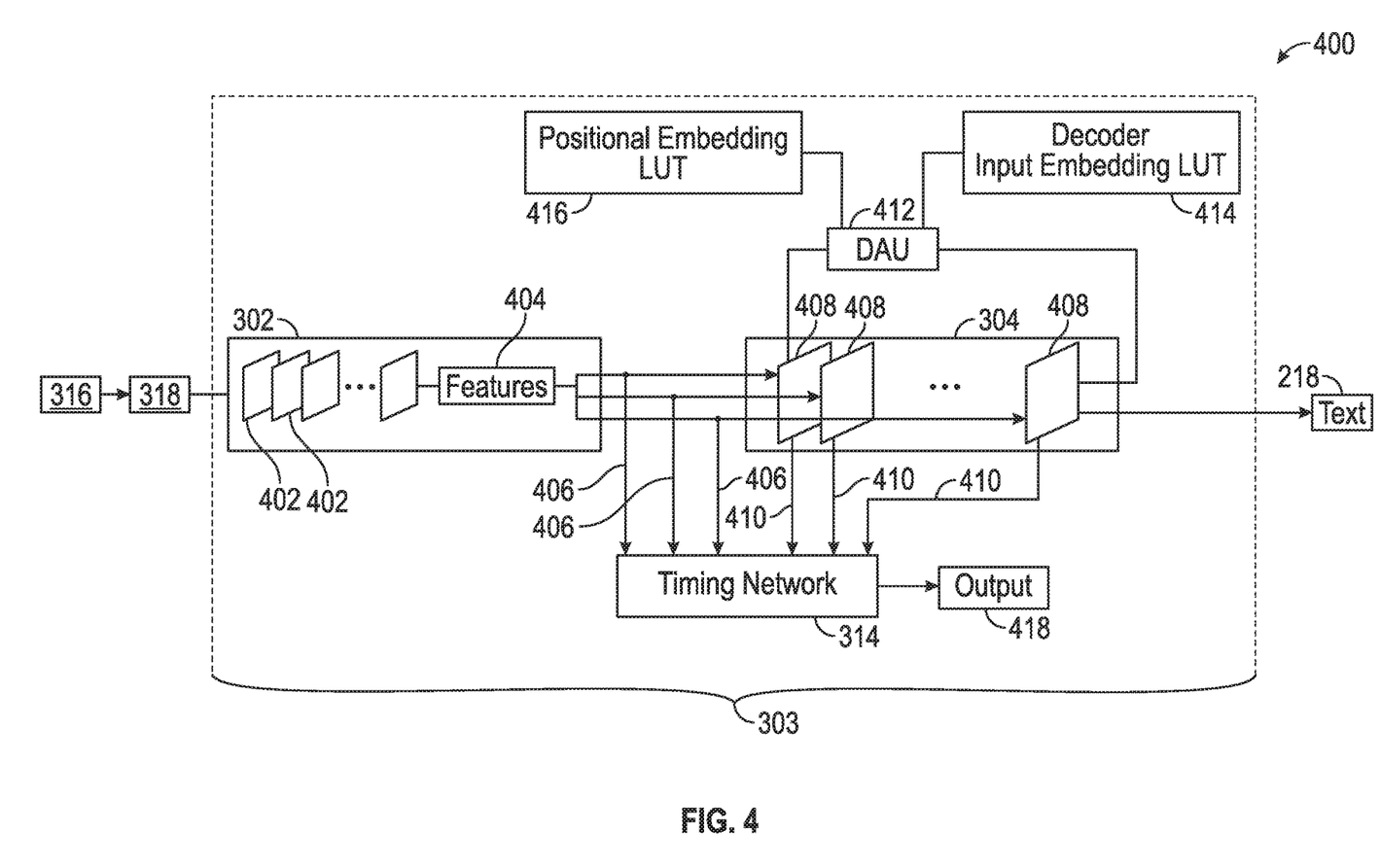
FIG. 4 illustrates a diagram of the transformer portion of the pipeline of the embodiment of FIG. 3.

FIG. 4 illustrates a diagram 400 of the transformer portion of the pipeline 300. As described earlier, the transformer 303 can include encoder 302 and decoder 304. The encoder and decoder can each include a plurality of layers. The input 318 to the encoder 302 is the output 316 of the terminating layer of the end-to-end ASR model 301, shown in FIG. 3. If the encoder 302 were a traditional encoder, the input 318 would be text, but the encoder 302 is modified to accept a learned input from the terminating layer of the ASR model 301. In some embodiments, the input 318 are tokens compatible with the input layer of the encoder 302. An example token for the input 318 is a sequence of integer indices in a vocabulary dataset. The last layer of the end-to-end ASR model 301 can include a variety of operations and transformation to make the output 316 and the input 318 compatible. The output/input 316, 318 are learnable parameters of the pipeline 300. In the embodiment of the end-to-end ASR model 301, shown in FIG. 3, the last layer of the end-to-end ASR model 301 is a linear layer 312. The encoder 302 includes a plurality of encoder layers 402. The input 318 goes through the encoder layers 402, and the output of the last encoder layer 402 becomes the input features 404 to the decoder 304. The decoder 304 includes a plurality of decoder layers 408. Each decoder layer 408 receives the features 404 from the encoder 302. Each token in the input 318 is converted into an embedding vector, for example a 512-dimensional vector. During training, the transformer 303 learns the embedding vector(s). The transformer 303 also injects positional encoding into each embedding, so that the model can know positions of the input tokens, without use of recurrence or RNNs.

The decoder 304 includes a plurality of decoder layers 408, which accept the features 404 as input. The features 404 are the embedding vectors produced by the encoder 302 for each token. The decoder 304 processes and outputs one token at a time. An output token becomes the subsequent input to the decoder. In other words, a previous output from the decoder 304 becomes the last part of the next input to the decoder 304.

A decoder auxiliary unit (DAU) 412 provides the start of sequence (SOS) token to initiate the decoder operations. The decoder layers 408 encode the SOS with the contextual information from the input features 404. In other words, the decoder transforms the initial embedding vector SOS into a vector containing information for predicting the first token. The first predicted token is fed back to the decoder through the DAU 412 to produce the next token. In other words, a predicted token becomes part of the next decoder input. Once the decoder 304 predicts the first token sequence, the DAU 412 performs a series of operations that feed back into the first decoder layer 408.

The DAU 412 operations include converting the decoder predicted tokens into embedding vectors. In some embodiments, the DAU 412, can perform the conversion of the predicted tokens into embedding vectors by using a decoder input embedding look-up table (LUT) 414. The operations of the DAU 412 can also include fetching positional embeddings for each token from a positional embedding LUT 416 and adding each positional embedding to the embedding vector for each token. In some embodiments, the DAU 412 also performs various normalization operations. The processes of the decoder 304 and the DAU 412 repeat until the model predicts the end of sequence (EOS) token as the most probable output.

The transformer 303 can also include a timing network 314, which can operate in parallel to the transformer 303. The trained timing network 314 can predict the timing of the tokens of the transcribed input audio. In other words, the timing network 314 can allow the pipeline 303 to track the timing of the tokens spoken in the input audio. The timing network 314 can receive one or more of inputs 406, 410, and/or a combination of them. In some embodiments, the inputs 406 can be all or some of the cross-attention weights between the encoder 302 and the decoder 304, from each decoder layer 408. In some embodiments, the inputs 410 can be the output of each decoder layer 408, or the decoder hidden states, in response to the embedded decoder input. In some embodiments, the inputs 406 and 410 can be both used as inputs to the timing network 314. In other embodiments, either inputs 406 or inputs 410, or a subset of each are used. Choosing various combinations of inputs to the timing network 314 can impact the quality of the output of the timing network. In some embodiments, empirical analysis can be used to select an optimal set of inputs to the timing network 314. The timing network inputs 406, 410, or a combination of the inputs 406, 408, are derived for each token predicted by the decoder 304 and are concatenated into a single feature vector for each token. These feature vectors contain timing information for the predicted tokens, which can be used to generate the output 418. The output 418 is the timing of the tokens predicted by the transformer 303. The output 418 can be used to generate absolute or relative timing metadata for the text 218.

Teacher-Student Training

An ASR pipeline, including the pipeline 300, can be trained utilizing an embodiment, which can be termed "teacher-student training method." The teacher-student training method can be used to generate from a first and larger ASR model, a smaller, yet efficient second ASR model. The first ASR model can be termed the teacher model and the second ASR model can be termed the student model.

The student model is derived from or cloned from the teacher model, with some layers removed. Removing layers from an already trained model can negatively impact its performance during inference operations because the contribution of the removed layers is lost. On the other hand, when teacher-student training method is used, the remaining layers in the student model can learn the training data and can perform efficiently, despite having fewer layers compared to the teacher model. In one respect, the student model can perform more efficiently than the teacher model because it can have substantially fewer layers to process during inference operations. While the teacher-student training method will be described in the context of ASR pipelines, the method can also be applicable to other artificial intelligence pipelines in other contexts.

Figure 5:
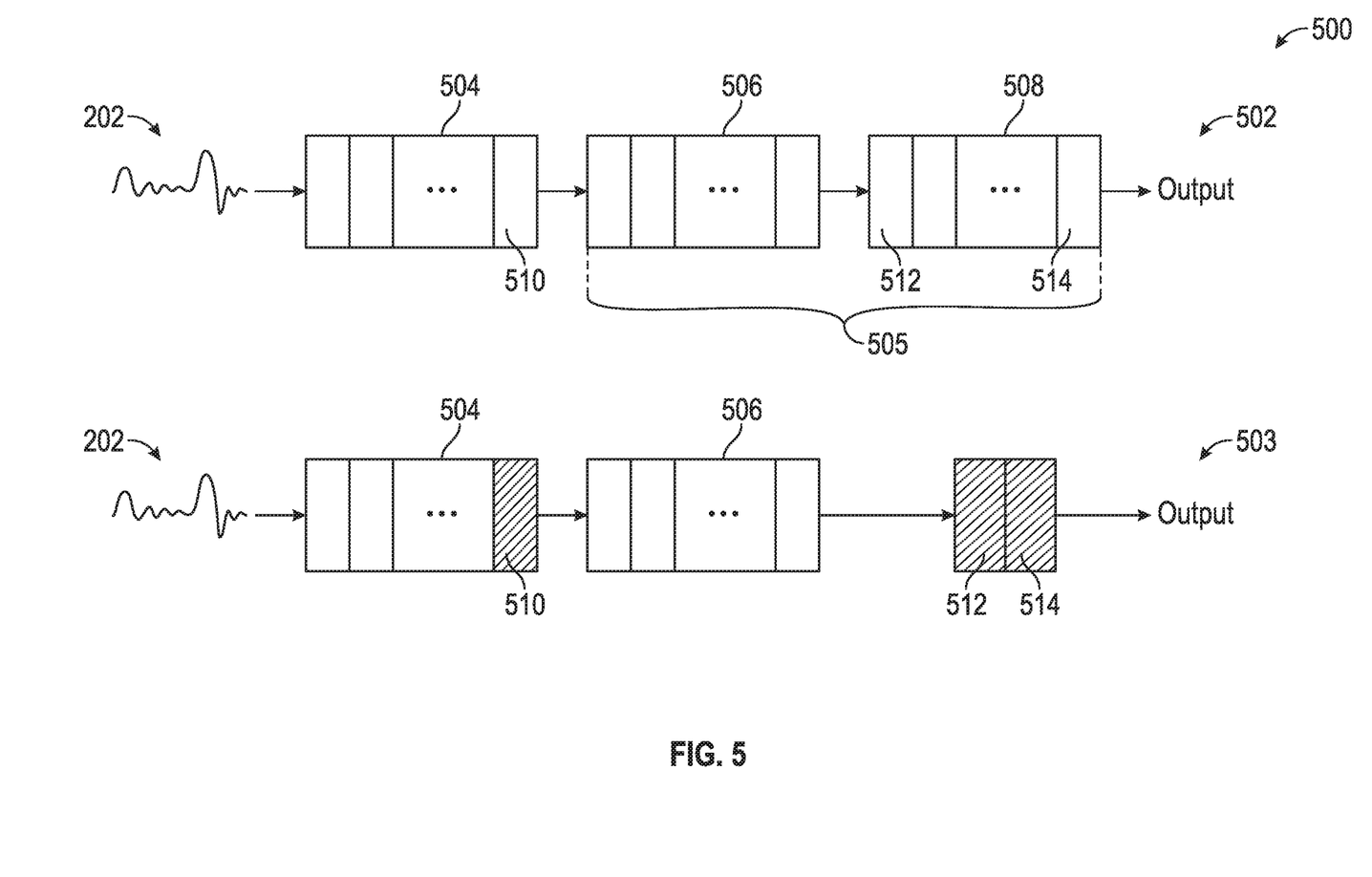
FIG. 5 illustrates an example diagram of a teacher model and a student model.

FIG. 5 illustrates an example diagram 500 of a teacher model 502 and a student model 503. The teacher model 502 is a trained ASR pipeline. An example of the teacher model 502 is the pipeline 300 as described above. The teacher model 502 can include a language model (LM) 504 and a transformer 505. The transformer 505 can include an encoder 506, and a decoder 508. The LM 504 can include a plurality of LM layers that encode language tokens, albeit in an end-to-end model, such as the pipeline 300, the language tokens are not explicitly encoded. The operations of the model can implicitly encode language tokens that can be roughly correlated with parts of language and speech, such as phonemes and words. The LM 504 can be a stack of various AI layers, such as CNN, linear and/or RNN layers. The last layer of the LM model 504 can be termed the language model head (LM head) 510. The encoder 506 and the decoder 508 each have a plurality of layers.

The teacher-student training method begins by cloning the teacher model and selectively removing some layers and retaining the other layers. The selection of layers to remove and layers to keep can be based on the relative importance of the layers compared to others and/or the expected characteristics of the type of training data the layers encode. The input/output or interface layers of the various portions of the teacher model can be relatively more important and encode more of the training data. For example, the student model 503 can be generated by retaining the LM 504, and the encoder 506, but discarding the intermediary decoder layers flanked by the decoder input layer 512 and the decoder output layer 514. In other examples, the student model can be generated by truncating the encoder layers, or by truncating a combination of the encoder and the decoder layers. In other examples, the selection of layers to remove or retain can include the LM 504 as well.

In some embodiments, the layers selected for removal in the student model can be based on the resources those layers take up during inference operations. For example, the encoder and decoder operations can be relatively more demanding on hardware and more resource-intensive. Therefore, the transformer layers are good candidates for removal in the student model. In the example student model 503, the decoder input layer 512 and the decoder output layer 514 are retained. The decoder input layer 512 is relatively more important than the intermediary layers because it sets up the input for all other decoder layers. The output decoder layer 514 is also relatively more important than the intermediary decoder layers because it produces the final output for the transformer and for the entire end-to-end ASR model. Therefore, the decoder input/output layers 512, 514 are good candidates for including in the student model, as is done in the example student model 503.

After generating the student model, the student model is trained. During training, in response to the removed layers, the student model layers learn to adapt to the new architecture of the model, encoding the same information in fewer layers. For example, when the decoder is truncated, the encoder layers adapt to encode the language data received from the LM 504 differently and congruent with the truncated decoder. Training the student model can be performed in one or more phases. In some embodiments, a high-energy training phase can freeze some layers of the student model, causing the student model to force the information embedded in the training data into the unfrozen layers. In this manner, the unfrozen layers quickly converge to a trained state where they encode most of the information embedded in the training data. The high-energy training phase can be followed by a low-energy training phase, where the previously frozen layers are unfrozen and the student model is trained end-to-end to allow all layers to shift and adjust to a more trained state. The high-energy training phase lets the model converge to an optimal trained state, while the low-energy training phase lets the model make more gradual adjustments near the optimum trained state found in the high-energy training phase.

The term high-energy training phase is used to refer to the model making larger adjustments during the high-energy training phase to converge the unfrozen layers into an optimum or near optimum trained state, while the term low-energy phase is used to refer to the model making smaller adjustments during the low-energy training phase to find a more optimum trained state for the entire model near the previously converged trained state. Freezing operation can include freezing the weights in the frozen layers from moving or adjusting during training operations. Freezing a layer can include excluding the loss contributed from the frozen layers, contributing a loss of zero from the frozen layers during training, or passing through the frozen layers, without any weight adjustments, during backpropagation when performing training.

The decision regarding which layers to freeze and which layers to leave unfrozen, during the high-energy training phase, can depend on determining which layers in the student model are more likely to need to change the most in relation to the change in architecture of the student model relative to the teacher model. For example, when the decoder is truncated, as in the example student model 503, the remaining decoder layers can be expected to experience the most change during the high-energy training phase. Similarly, when the decoder is truncated, the LM head 510 can experience relatively larger changes, as it is downstream of the truncated decoder layers and learns to encode information from their outputs. Another candidate layer for leaving unfrozen during the high-energy training phase is the last layer of the encoder 506. This can be expected as the encoder 506 might have to learn slightly different encodings to produce better outputs for the truncated decoder.

For the student model 503, a one- or two-phase training approach can be used. In the one-phase approach, the student model 503 can be trained end-to-end and used in inference operations. In another one-phase approach, some layers can be frozen and the model can be trained end-to-end with only one training pass. The model can subsequently be used in inference operations. Example candidate layers to leave unfrozen include the decoder input/output layers 512, 514 and the LM head 510. In some embodiments, the last layer of the encoder can also be left unfrozen. Other selections of layers to leave unfrozen can also be used.

The two-phase training approach can include a high-energy training phase and a low-energy training phase as described above. In the high-energy training phase, some layers can be frozen and the remaining layers can be left unfrozen. For example, during the high-energy training phase, all layers, except the decoder input/output layers 512, 514 and the LM head 510 can be frozen. The student model with selected frozen layers can be trained. Next, for the low-energy training phase, all layers are unfrozen, and the model is trained end-to-end. The trained student model can be used in inference operations.

Figure 6A:
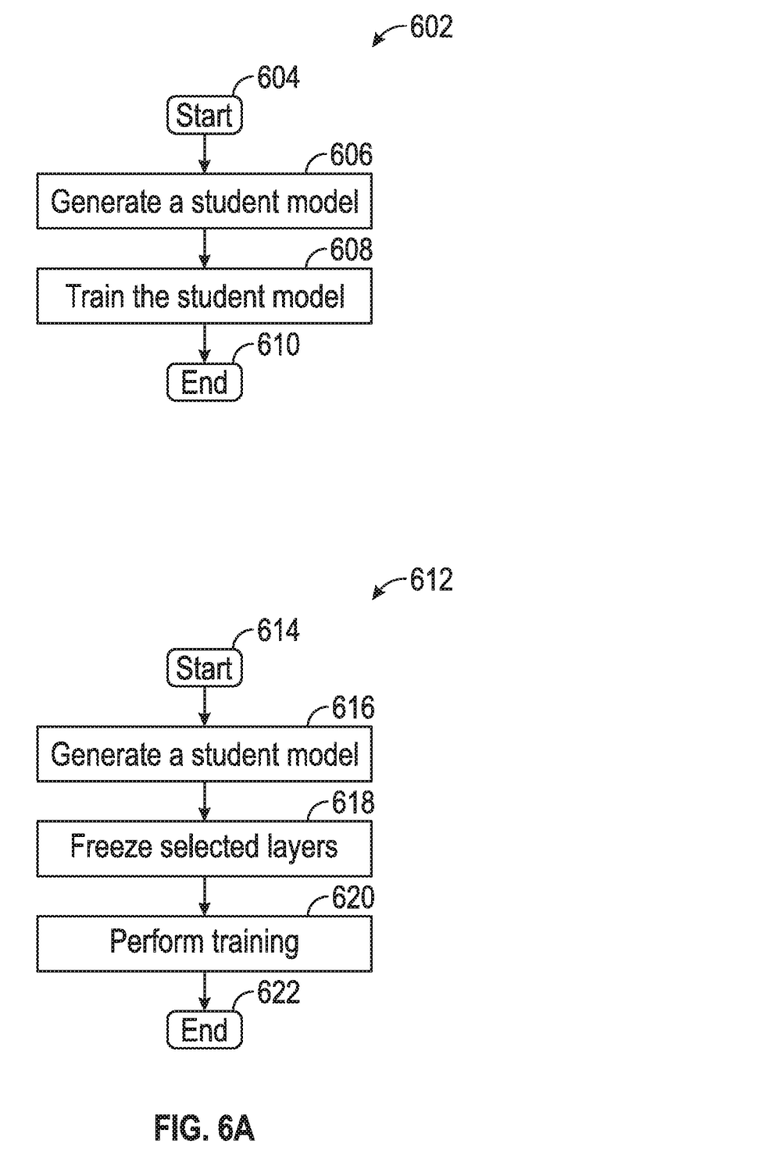
FIGS. 6A and 6B illustrate flowcharts of example teacher-student training methods according to some embodiments.
Figure 6B:
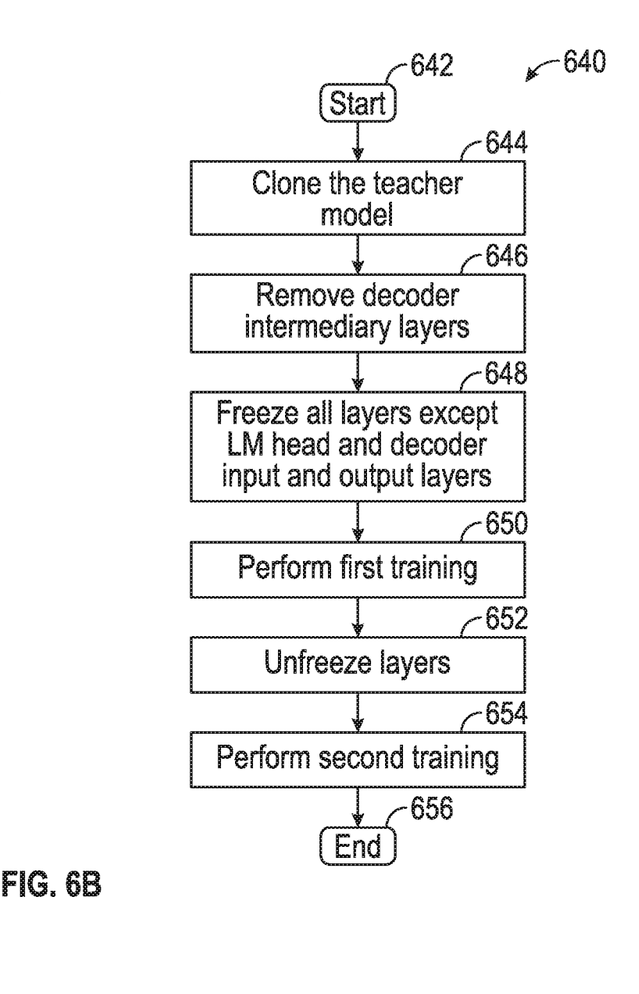

FIGS. 6A and 6B illustrate flowcharts of example teacher-student training methods according to some embodiments. The method 602 starts at step 604. At step 606, a student model is generated. The student model is generated from a clone of a teacher model, for example, from the trained teacher model 502 shown in FIG. 5. The student model selectively removes some layers of the teacher model. The selection of the layers to retain can depend on a variety of factors, including the relative importance of the retained layers in the overall pipeline, the characteristics of the information encoded in the retained layers, and the extent of the training information encoded in the retained layers relative to the omitted layers. The more information a layer encodes, the better candidate the layer is for retention in the student model. Furthermore, the interface layers between the various components of an ASR model, such as the input/output layers between the LM 504 and encoder 506, or between the encoder 506 and the decoder 508 are candidates for retention in the student model. The selection of layers to omit can also depend on the relative ratio of performance cost of the layer versus the amount of information encoded in the layer. For example, the encoder/decoder layers can use substantial hardware resources during their operations. As a result, the encoder/decoder layers can be good candidates for removal in the student model. At step 608, the student model can be trained end-to-end and used in inference operations. The method 602 ends at step 610.

The method 612 starts at step 614. At step 616, a student model is generated as described in relation to the step 606 of the method 602. At step 618, selected layers of the student model are frozen and the remaining layers are left unfrozen. For example, in the student model 503 shown in FIG. 5, every layer is frozen except the LM head 510 and the decoder input/output layers 512, 514. At step 620, the student model with selectively frozen layers is trained. The method 612 ends at step 622, and the trained student model can be used in inference operations.

The method 624 starts at step 626. At step 628, a student model is generated as described above in relation to the step 606 of the method 602. At step 630, some layers of the student model are selectively frozen. At step 632, a first training on the student model with selectively frozen layers is performed. The first training performed at step 632 can be a high-energy training phase as described above. At step 634, the frozen layers are unfrozen. At step 636, a second training is performed on the student model as an end-to-end single model. The method 624 ends at step 638, and the student model can be used in inference operations.

The method 640 illustrates a flowchart of an example teacher-student training, which can be used to generate and train a student model from an end-to-end ASR pipeline having a transformer component with an encoder/decoder. The method 640 will be described in relation to both FIGS. 5, 6A and 6B. The method 640 can be used to generate and train the student model 503 from a trained teacher model 502. The method 640 starts at step 642. At step 644, to begin generating the student model 503, the trained teacher model 502 is cloned. At step 646, the intermediary layers of the decoder 508 are removed, while the decoder input/output layers 512, 514 are retained in the student model 503. At step 648, all layers of the student model 503 are frozen, except the LM head 510 and the decoder input/output layers 512, 514. At step 650, a first training on the student model 503 is performed. The first training can be a high-energy training phase as described above. At step 652, the frozen layers are unfrozen. At step 654, a second training on the student model 503 is performed. The second training can be a low-energy training phase as described above. At step 656, the method 640 ends, and the student model 503 can be used in inference operations.

Example Implementation Mechanism—Hardware Overview

Some embodiments are implemented by a computer system or a network of computer systems. A computer system may include a processor, a memory, and a non-transitory computer-readable medium. The memory and non-transitory medium may store instructions for performing methods, steps and techniques described herein.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computers, cloud computing computers, desktop computer systems, portable computer systems, handheld devices, networking devices or any other device that incorporates hard-wired and/or program logic to implement the techniques.

Figure 7:
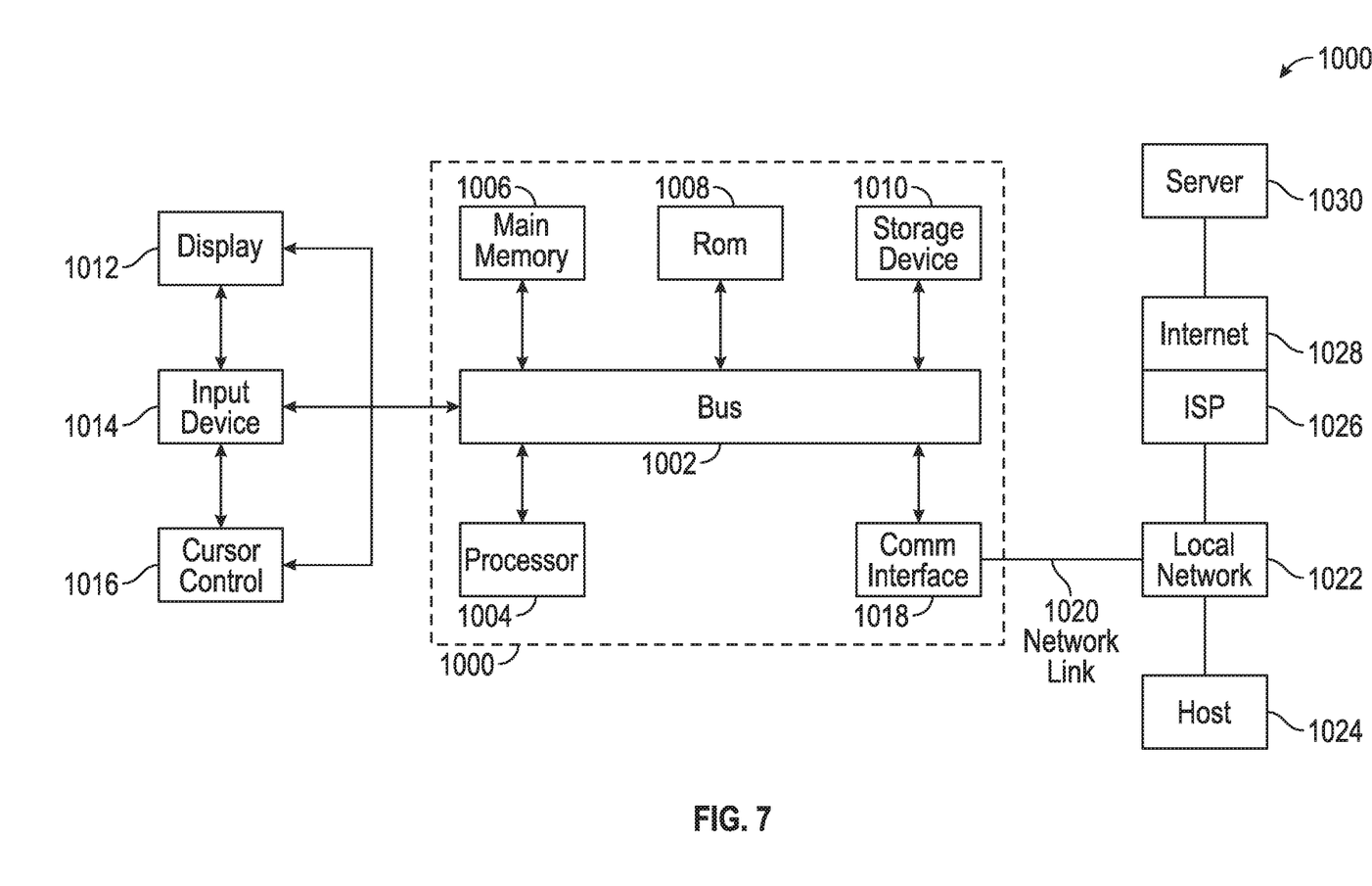
FIG. 7 is a block diagram that illustrates a computer system upon which an embodiment can be implemented.

For example, FIG. 7 is a block diagram that illustrates a computer system 1000 upon which an embodiment can be implemented. Computer system 1000 includes a bus 1002 or other communication mechanism for communicating information, and a hardware processor 1004 coupled with bus 1002 for processing information. Hardware processor 1004 may be, for example, special-purpose microprocessor optimized for handling audio and video streams generated, transmitted or received in video conferencing architectures.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid state disk is provided and coupled to bus 1002 for storing information and instructions.

Computer system 1000 may be coupled via bus 1002 to a display 1012, such as a cathode ray tube (CRT), liquid crystal display (LCD), organic light-emitting diode (OLED), or a touchscreen for displaying information to a computer user. An input device 1014, including alphanumeric and other keys (e.g., in a touch screen display) is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the user input device 1014 and/or the cursor control 1016 can be implemented in the display 1012 for example, via a touch-screen interface that serves as both output display and input device.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical, magnetic, and/or solid-state disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution.

EXAMPLES

It will be appreciated that the present disclosure may include any one and up to all of the following examples.

Example 1: A method comprising: receiving an audio clip; generating a combination speech recognition pipeline by fusing a first speech recognition pipeline with a transformer, the transformer having an input layer configured to receive text as input, wherein the fusing comprises: modifying the input layer of the transformer to accept a learned output from a terminating layer of the first pipeline; configuring the terminating layer of the first pipeline to generate the learned output compatible with the modified input layer of the transformer; and training the combination speech recognition pipeline as a single model, to receive the audio clip and generate a transcript of the audio clip.

Example 2: The method of Example 1, wherein training the combination speech recognition pipeline comprises the terminating layer of the first pipeline learning input embedding vectors of an encoder of the transformer.

Example 3: The method of some or all of Examples 1 and 2, wherein the terminating layer of the first pipeline is a linear layer, and fusing further comprises training the linear layer to learn an input of an encoder layer of the transformer.

Example 4: The method of some or all of Examples 1-3, wherein modifying the input layer of the transformer further comprises eliminating a tokenization layer from the transformer.

Example 5: The method of some or all of Examples 1-4, further comprising generating a timing network configured to predict timing data for each speech token predicted by the transformer.

Example 6: The method of some or all of Examples 1-5, wherein the transformer comprises an encoder and a decoder, the decoder having a plurality of layers, and the method further comprises: receiving, by a timing network, one or more of: cross-attention weights between the encoder and the decoder from each decoder layer, a hidden state of each decoder layer in response to a decoder embedded input; and generating, by the timing network, a feature vector for each token predicted by the decoder, comprising the cross-attention weights, and the decoder hidden states of each decoder layer for the predicted token.

Example 7: The method of some or all of Examples 1-6, wherein the first pipeline comprises a plurality of language model layers, the transformer comprises an encoder and a decoder, the encoder comprises a plurality of encoder layers and the decoder comprises a plurality of decoder layers, wherein the method further comprises: generating a student model by removing one or more layers from one or more of the language model layers, the encoder layers and/or the decoder layers; and training the student model to receive the audio clip and generate a transcript of the audio clip.

Example 8: The method of some or all of Examples 1-7, wherein the first pipeline comprises a plurality of language model layers, the transformer comprises an encoder and a decoder, the encoder comprises a plurality of encoder layers and the decoder comprises a plurality of decoder layers, wherein the method further comprises: generating a student model by removing one or more layers from one or more of the language model layers, the encoder layers and/or the decoder layers, the student model comprising a plurality of student model layers; freezing one or more of the layers of the student model; and training the student model with one or more frozen layers to receive the audio clip and generate a transcript of the audio clip.

Example 9: The method of some or all of Examples 1-8, wherein the first pipeline comprises a plurality of language model layers, the transformer comprises an encoder and a decoder, the encoder comprises a plurality of encoder layers and the decoder comprises a plurality of decoder layers, wherein the method further comprises: generating a student model by removing one or more layers from one or more of the language model layers, the encoder layers and/or the decoder layers, the student model comprising a plurality of student model layers; freezing one or more of layers of the student model; and performing a first training of the student model with one or more of the layers of the student model frozen; unfreezing the frozen layers of the student model; performing a second training of the student model to receive the audio clip and generate a transcript of the audio clip.

Example 10: The method of some or all of Examples 1-9, wherein the first pipeline comprises a plurality of language model layers terminating in a language model head, the transformer comprises an encoder and a decoder, the encoder comprises a plurality of encoder layers and the decoder comprises a decoder input layer, decoder intermediary layers and a decoder output layer, wherein the method further comprises: generating a student model by removing the decoder intermediary layers; freezing the remaining layers, except the language model head and the decoder input and output layers; performing a first training of the student model; unfreezing the layers; and performing a second training of the student model.

Example 11: A non-transitory computer storage that stores executable program instructions that, when executed by one or more computing devices, configure the one or more computing devices to perform operations comprising: receiving an audio clip; generating a combination speech recognition pipeline by fusing a first speech recognition pipeline with a transformer, the transformer having an input layer configured to receive text as input, wherein the fusing comprises: modifying the input layer of the transformer to accept a learned output from a terminating layer of the first pipeline; configuring the terminating layer of the first pipeline to generate the learned output compatible with the modified input layer of the transformer; and training the combination speech recognition pipeline as a single model, to receive the audio clip and generate a transcript of the audio clip.

Example 12: The non-transitory computer storage of Example 11, wherein training the combination speech recognition pipeline comprises the terminating layer of the first pipeline learning input embedding vectors of an encoder of the transformer.

Example 13: The non-transitory computer storage of some or all of Examples 11 and 12, wherein the terminating layer of the first pipeline is a linear layer, and fusing further comprises training the linear layer to learn an input of an encoder layer of the transformer.

Example 14: The non-transitory computer storage of some or all of Examples 11-13, wherein modifying the input layer of the transformer further comprises eliminating a tokenization layer from the transformer.

Example 15: The non-transitory computer storage of some or all of Examples 11-14, wherein the operations further comprise generating a timing network configured to predict timing data for each speech token predicted by the transformer.

Example 16: The non-transitory computer storage of some or all of Examples 11-15, wherein the transformer comprises an encoder and a decoder, the decoder having a plurality of layers, and the operations further comprise: receiving, by a timing network, one or more of: cross-attention weights between the encoder and the decoder from each decoder layer, a hidden state of each decoder layer in response to a decoder embedded input; and generating, by the timing network, a feature vector for each token predicted by the decoder, comprising the cross-attention weights, and the decoder hidden states of each decoder layer for the predicted token.

Example 17: The non-transitory computer storage of some or all of Examples 11-16, wherein the first pipeline comprises a plurality of language model layers, the transformer comprises an encoder and a decoder, the encoder comprises a plurality of encoder layers and the decoder comprises a plurality of decoder layers, wherein the operations further comprise: generating a student model by removing one or more layers from one or more of the language model layers, the encoder layers and/or the decoder layers; and training the student model to receive the audio clip and generate a transcript of the audio clip.

Example 18: The non-transitory computer storage of some or all of Examples 11-17, wherein the first pipeline comprises a plurality of language model layers, the transformer comprises an encoder and a decoder, the encoder comprises a plurality of encoder layers and the decoder comprises a plurality of decoder layers, wherein the operations further comprise: generating a student model by removing one or more layers from one or more of the language model layers, the encoder layers and/or the decoder layers, the student model comprising a plurality of student model layers; freezing one or more of the layers of the student model; and training the student model with one or more frozen layers to receive the audio clip and generate a transcript of the audio clip.

Example 19: The non-transitory computer storage of some or all of Examples 11-18, wherein the first pipeline comprises a plurality of language model layers, the transformer comprises an encoder and a decoder, the encoder comprises a plurality of encoder layers and the decoder comprises a plurality of decoder layers, wherein the operations further comprise: generating a student model by removing one or more layers from one or more of the language model layers, the encoder layers and/or the decoder layers, the student model comprising a plurality of student model layers; freezing one or more of layers of the student model; and performing a first training of the student model with one or more of the layers of the student model frozen; unfreezing the frozen layers of the student model; performing a second training of the student model to receive the audio clip and generate a transcript of the audio clip.

Example 20: The non-transitory computer storage of some or all of Examples 11-19, wherein the first pipeline comprises a plurality of language model layers terminating in a language model head, the transformer comprises an encoder and a decoder, the encoder comprises a plurality of encoder layers and the decoder comprises a decoder input layer, decoder intermediary layers and a decoder output layer, wherein the operations further comprise: generating a student model by removing the decoder intermediary layers; freezing the remaining layers, except the language model head and the decoder input and output layers; performing a first training of the student model; unfreezing the layers; and performing a second training of the student model.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed is:

1. A method comprising:
   receiving an audio clip;
   generating a combination speech recognition pipeline by fusing a first speech recognition pipeline with a transformer, the transformer having an input layer configured to receive text as input, wherein the fusing comprises:
   modifying the input layer of the transformer to accept a learned output from a terminating layer of the first pipeline;
   configuring the terminating layer of the first pipeline to generate the learned output compatible with the modified input layer of the transformer; and
   training the combination speech recognition pipeline as a single model, to receive the audio clip and generate a transcript of the audio clip.

2. The method of claim 1, wherein training the combination speech recognition pipeline comprises the terminating layer of the first pipeline learning input embedding vectors of an encoder of the transformer.

3. The method of claim 1, wherein the terminating layer of the first pipeline is a linear layer, and fusing further comprises training the linear layer to learn an input of an encoder layer of the transformer.

4. The method of claim 1, wherein modifying the input layer of the transformer further comprises eliminating a tokenization layer from the transformer.

5. The method of claim 1, further comprising generating a timing network configured to predict timing data for each speech token predicted by the transformer.

6. The method of claim 1, wherein the transformer comprises an encoder and a decoder, the decoder having a plurality of layers, and the method further comprises:
   receiving, by a timing network, one or more of: cross-attention weights between the encoder and the decoder from each decoder layer, a hidden state of each decoder layer in response to a decoder embedded input; and
   generating, by the timing network, a feature vector for each token predicted by the decoder, comprising the cross-attention weights, and the decoder hidden states of each decoder layer for the predicted token.

7. The method of claim 1, wherein the first pipeline comprises a plurality of language model layers, the transformer comprises an encoder and a decoder, the encoder comprises a plurality of encoder layers and the decoder comprises a plurality of decoder layers, wherein the method further comprises:
   generating a student model by removing one or more layers from one or more of the language model layers, the encoder layers and/or the decoder layers; and
   training the student model to receive the audio clip and generate a transcript of the audio clip.

8. The method of claim 1, wherein the first pipeline comprises a plurality of language model layers, the transformer comprises an encoder and a decoder, the encoder comprises a plurality of encoder layers and the decoder comprises a plurality of decoder layers, wherein the method further comprises:
   generating a student model by removing one or more layers from one or more of the language model layers, the encoder layers and/or the decoder layers, the student model comprising a plurality of student model layers;
   freezing one or more of the layers of the student model; and
   training the student model with one or more frozen layers to receive the audio clip and generate a transcript of the audio clip.

9. The method of claim 1, wherein the first pipeline comprises a plurality of language model layers, the transformer comprises an encoder and a decoder, the encoder comprises a plurality of encoder layers and the decoder comprises a plurality of decoder layers, wherein the method further comprises:
   generating a student model by removing one or more layers from one or more of the language model layers, the encoder layers and/or the decoder layers, the student model comprising a plurality of student model layers;
freezing one or more of layers of the student model; and
performing a first training of the student model with one or more of the layers of the student model frozen;
unfreezing the frozen layers of the student model;
performing a second training of the student model to receive the audio clip and generate a transcript of the audio clip.

10. The method of claim 1, wherein the first pipeline comprises a plurality of language model layers terminating in a language model head, the transformer comprises an encoder and a decoder, the encoder comprises a plurality of encoder layers and the decoder comprises a decoder input layer, decoder intermediary layers and a decoder output layer, wherein the method further comprises:
generating a student model by removing the decoder intermediary layers;
freezing the remaining layers, except the language model head and the decoder input and output layers;
performing a first training of the student model;
unfreezing the layers; and
performing a second training of the student model.

11. A non-transitory computer storage that stores executable program instructions that, when executed by one or more computing devices, configure the one or more computing devices to perform operations comprising:
receiving an audio clip;
generating a combination speech recognition pipeline by fusing a first speech recognition pipeline with a transformer, the transformer having an input layer configured to receive text as input, wherein the fusing comprises:
modifying the input layer of the transformer to accept a learned output from a terminating layer of the first pipeline;
configuring the terminating layer of the first pipeline to generate the learned output compatible with the modified input layer of the transformer; and
training the combination speech recognition pipeline as a single model, to receive the audio clip and generate a transcript of the audio clip.

12. The non-transitory computer storage of claim 11, wherein training the combination speech recognition pipeline comprises the terminating layer of the first pipeline learning input embedding vectors of an encoder of the transformer.

13. The non-transitory computer storage of claim 11, wherein the terminating layer of the first pipeline is a linear layer, and fusing further comprises training the linear layer to learn an input of an encoder layer of the transformer.

14. The non-transitory computer storage of claim 11, wherein modifying the input layer of the transformer further comprises eliminating a tokenization layer from the transformer.

15. The non-transitory computer storage of claim 11, wherein the operations further comprise generating a timing network configured to predict timing data for each speech token predicted by the transformer.

16. The non-transitory computer storage of claim 11, wherein the transformer comprises an encoder and a decoder, the decoder having a plurality of layers, and the operations further comprise:
receiving, by a timing network, one or more of: cross-attention weights between the encoder and the decoder from each decoder layer, a hidden state of each decoder layer in response to a decoder embedded input; and
generating, by the timing network, a feature vector for each token predicted by the decoder, comprising the cross-attention weights, and the decoder hidden states of each decoder layer for the predicted token.

17. The non-transitory computer storage of claim 11, wherein the first pipeline comprises a plurality of language model layers, the transformer comprises an encoder and a decoder, the encoder comprises a plurality of encoder layers and the decoder comprises a plurality of decoder layers, wherein the operations further comprise:
generating a student model by removing one or more layers from one or more of the language model layers, the encoder layers and/or the decoder layers; and
training the student model to receive the audio clip and generate a transcript of the audio clip.

18. The non-transitory computer storage of claim 11, wherein the first pipeline comprises a plurality of language model layers, the transformer comprises an encoder and a decoder, the encoder comprises a plurality of encoder layers and the decoder comprises a plurality of decoder layers, wherein the operations further comprise:
generating a student model by removing one or more layers from one or more of the language model layers, the encoder layers and/or the decoder layers, the student model comprising a plurality of student model layers;
freezing one or more of the layers of the student model; and
training the student model with one or more frozen layers to receive the audio clip and generate a transcript of the audio clip.

19. The non-transitory computer storage of claim 11, wherein the first pipeline comprises a plurality of language model layers, the transformer comprises an encoder and a decoder, the encoder comprises a plurality of encoder layers and the decoder comprises a plurality of decoder layers, wherein the operations further comprise:
generating a student model by removing one or more layers from one or more of the language model layers, the encoder layers and/or the decoder layers, the student model comprising a plurality of student model layers;
freezing one or more of layers of the student model; and
performing a first training of the student model with one or more of the layers of the student model frozen;
unfreezing the frozen layers of the student model;
performing a second training of the student model to receive the audio clip and generate a transcript of the audio clip.

20. The non-transitory computer storage of claim 11, wherein the first pipeline comprises a plurality of language model layers terminating in a language model head, the transformer comprises an encoder and a decoder, the encoder comprises a plurality of encoder layers and the decoder comprises a decoder input layer, decoder intermediary layers and a decoder output layer, wherein the operations further comprise:
generating a student model by removing the decoder intermediary layers;
freezing the remaining layers, except the language model head and the decoder input and output layers;

performing a first training of the student model;
unfreezing the layers; and
performing a second training of the student model.

* * * * *